United States Patent [19]
Gibbs et al.

[11] Patent Number: 5,963,440
[45] Date of Patent: Oct. 5, 1999

[54] CONTROLLED THREE-PHASE RECTIFIER WITH CURRENT COMPARISON BETWEEN RECTIFIER SEGMENTS

[75] Inventors: Irving A. Gibbs, Fletcher, N.C.; Bruce R. Quayle, Crafton, Pa.

[73] Assignee: Eaton Corporation, Cleveland, Ohio

[21] Appl. No.: 09/005,818

[22] Filed: Jan. 12, 1998

[51] Int. Cl.[6] .................................................. H02H 7/125
[52] U.S. Cl. ........................ 363/54; 363/70; 363/87; 363/129
[58] Field of Search ............................... 363/52, 53, 540, 363/67, 68, 69, 70, 85, 87, 88, 128, 129

[56] References Cited

U.S. PATENT DOCUMENTS

| | | | |
|---|---|---|---|
| 3,953,781 | 4/1976 | Forster et al. | 363/70 |
| 4,253,054 | 2/1981 | Steigerwald | 363/128 |
| 4,460,950 | 7/1984 | Finney | 363/129 |
| 5,031,087 | 7/1991 | Tuusa | 363/70 |

*Primary Examiner*—Jeffrey Sterrett
*Attorney, Agent, or Firm*—Martin J. Moran

[57] ABSTRACT

A parallel array of a plurality of controlled rectifier bridges for converting multi-phase AC current to DC. Each bridge includes a plurality of rectifier segments. One segment for each polarity of each phase of current. A sensor monitors the current and temperature at each rectifier. The sensor outputs for corresponding segments among the bridges are compared and the timing of the conduction of the rectifiers are controlled to maintain the current and temperatures among the corresponding segments in balance.

19 Claims, 5 Drawing Sheets

CONTROLLED THREE-PHASE RECTIFIER WITH CURRENT COMPARISON BETWEEN RECTIFIER SEGMENTS

BACKGROUND OF THE INVENTION

1. Field of the Invention

This invention pertains generally to rectifier circuits and more particularly three-phase rectifier bridges or SCR Bridges for converting alternating current (AC) to direct current (DC).

2. Background Information

AC three-phase rectifiers are commonly employed to convert AC signals to DC. These circuits commonly use semiconductor controlled rectifiers disposed in bridge segments; typically one for each polarity of each phase. The firing point for each rectifier in the cycle of the AC waveform is normally controlled by a bridge firing circuit. It is not uncommon for a number of bridges to be operated in parallel with each bridge firing circuit being controlled by a central firing circuit. The central control circuit manages each of the bridge firing circuits so that the corresponding rectifiers in each of the parallel bridges conducts current at the exact same point in the AC signal waveform.

It's desirable to have each of the semiconductor controlled rectifiers in each corresponding segment of the several bridges fired at the exact same time to ensure the quality of the DC signal output and avoid the necessity for extensive filtering circuits. Unfortunately, even slight variations in the nature of the components can vary the resistance and inductance of the segments, affecting their outputs and resulting in some imbalance. The imbalance can further affect the heating of the various components in the different segments, further affecting the outputs.

Accordingly, an improved rectifier control scheme is desired that can maintain the balance between rectifiers of corresponding segments of parallel bridges as well as control the overheating of the individual rectifiers.

SUMMARY OF THE INVENTION

An improved rectifier bridge for converting AC signals to DC having a plurality of rectifier segments including at least one segment for each polarity of each phase of current rectified by the bridge. Each rectifier is monitored by a current sensor whose output is fed to a comparator that identifies any imbalance or balance in the corresponding segments of the several phases. A bridge circuit monitors the comparator output and controls the firing of the rectifiers in the corresponding phases to maintain their outputs in a predetermined balance.

Where parallel bridges are employed the comparator monitors corresponding segments among the several bridges and the bridge control circuit manages the firing of the rectifiers to maintain the corresponding parallel segments in the desired balance. The firing of the rectifiers are controlled by either skipping a firing cycle or adjusting the timing of the point in the cycle that firing occurs.

In another preferred embodiment, a sensor monitors the temperature at each rectifier. The temperature outputs from the rectifiers in corresponding segments are compared. A central bridge control circuit monitors the output of the temperature comparison and either skips a cycle of firing or adjusts the timing point of firing of an individual rectifier that has exceeded a predetermined temperature differential, compared to the other rectifiers in the corresponding segments. The central control circuit also assures that not more than a predetermined number of rectifiers within corresponding segments are prevented from firing in any firing cycle.

These, together with other objects and advantages, which will subsequently be apparent, reside in the details of construction and operation as more fully described and claimed hereafter, reference being had to the accompanying drawings, wherein like numerals refer to like parts throughout.

DESCRIPTION OF THE PREFERRED EMBODIMENTS

Figure 1:
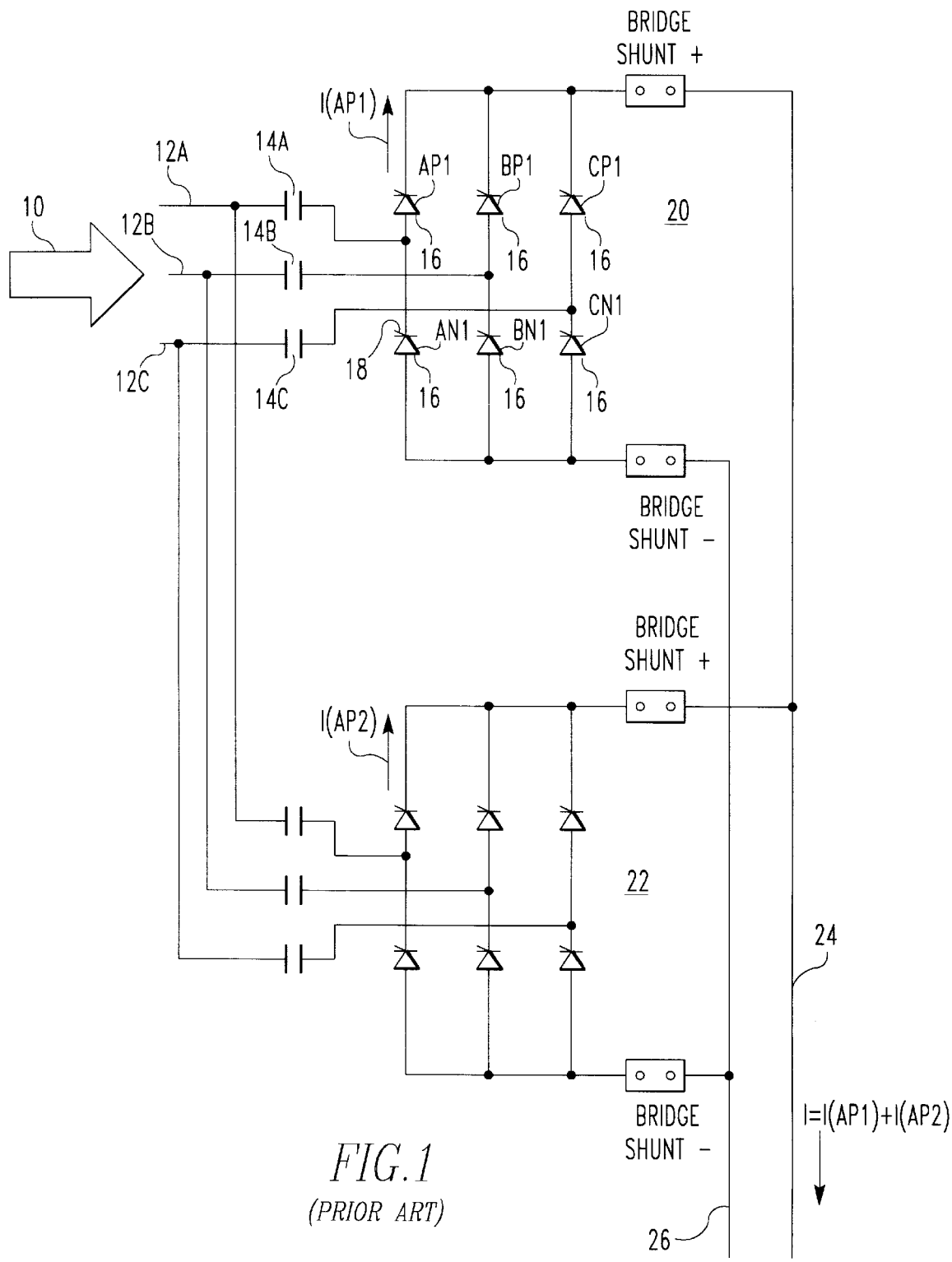
FIG. 1 is a circuit diagram that shows two, three-phase, semiconductor controlled rectifier bridges having an input from a common three-phase source and connected in parallel to provide an additive current output.

Bridges of semiconductor controlled rectifiers are generally employed to convert alternating current sinusoidal signal waveforms to direct current. A typical circuit used for this purpose is shown in FIG. 1 having two such bridges connected in parallel. Each of the bridges receives a multi-phase current input from a common source 10 which can be a motor generator or field transformer. A three phase current input is used in this example though it should be appreciated that the invention is not limited to the number of current phases employed in this embodiment. The several phases of input current, shown as 12A, 12B and 12C, are fed through corresponding contacts 14A, B and C to rectifying segments on the two bridges 20 and 22. The first and second bridges 20 and 22 respectively, each have six segments, one for each polarity of each phase. For example, segment AP1 refers to the positive polarity of phase A in the first bridge circuit while segment AN1 refers to the bridge 1 segment for the negative polarity of phase A. The remaining segments of the first and second bridges are noted in a similar manner by reference characters BP1, BN1, CP1, CN1, AP2, AN2, BP2, BN2, CP2 and CN2. Each segment includes its own semiconductor controlled rectifier (SCR) 16 that has a firing input 18. When a control signal is provided to input 18 the SCR fires. The SCR does not stop conducting until it is reversed biased. All the positive rectifier output currents are summed together and the negative output currents are similarly summed and conveyed by corresponding conductors 24 and 26 to the load.

Figure 2A:
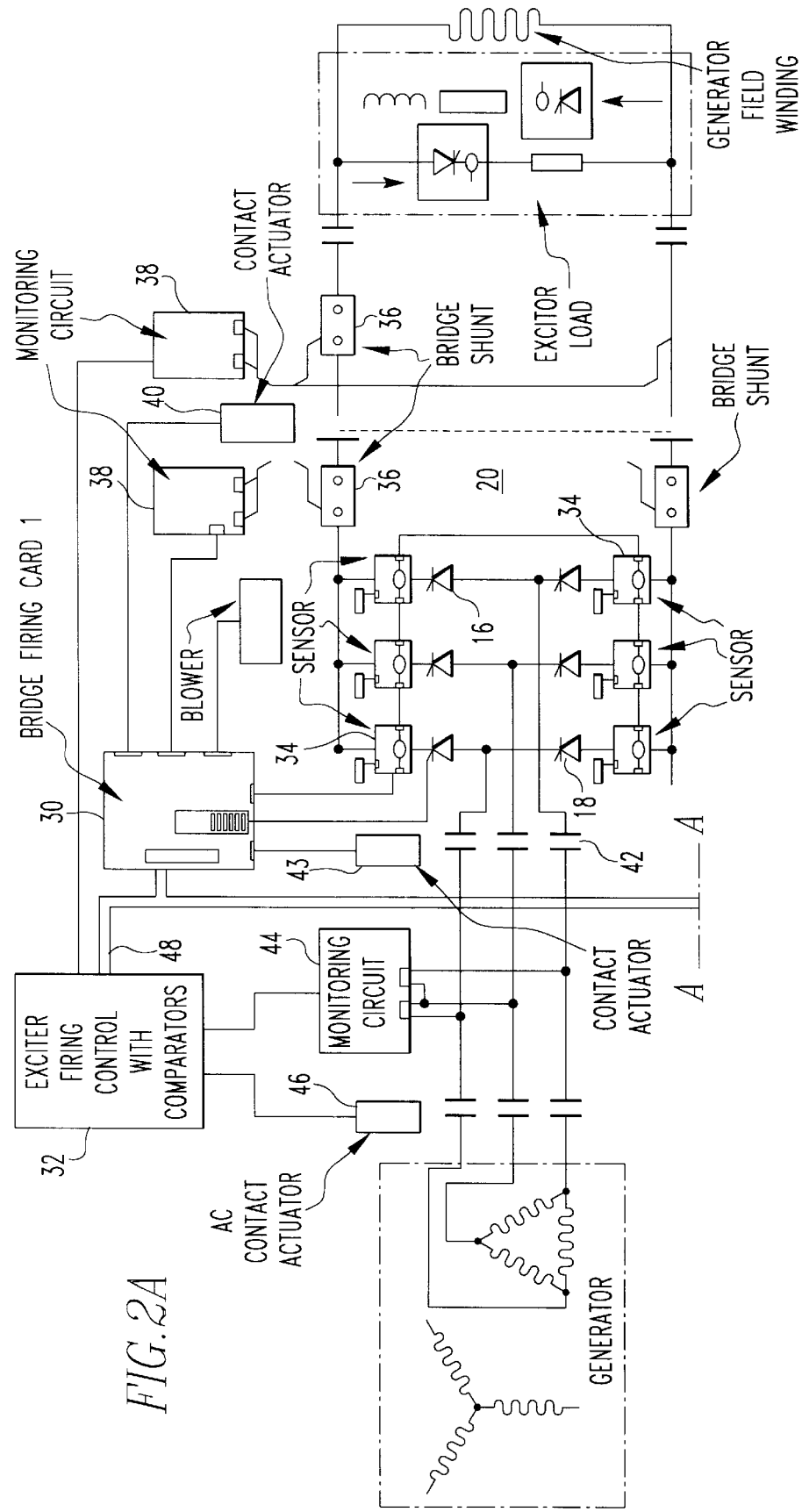
FIGS. 2A and 2B are a circuit diagram showing a parallel array of rectifier bridges, corresponding bridge control firing cards and a central exciter firing control for developing the field current for an electrical generator.
Figure 2B:
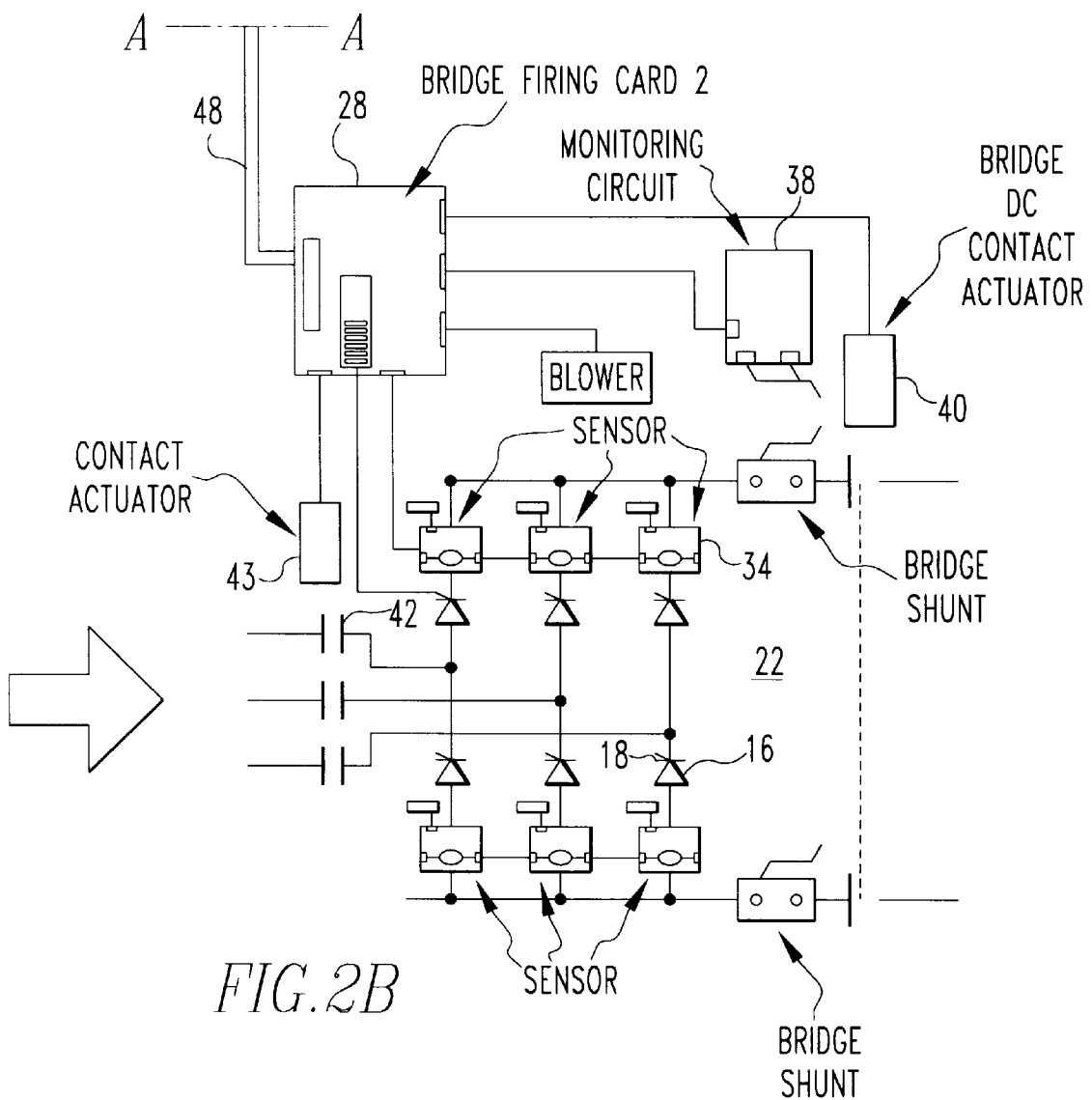

FIG. 2 shows a similar parallel array of bridges 20 and 22 controlled in accordance with this invention. Each bridge 20 and 22 has its own firing control circuit 28 and 30, respectively, which communicates with a central firing control circuit or exciter firing card 32. Each bridge firing controller 28 and 30 monitors corresponding sensors 34 which sense the temperature and current in the individual bridge segments associated with each SCR 16. The bridge firing circuits 28 and 30 also monitor the output currents of the bridge at the shunts 36 through a monitoring circuit 38 and use that information to control the output of the bridge through contact actuators 40. The bridge firing control circuits 28 and 30 also have the capability of controlling the AC input to the bridge through contacts 42 and actuator 43.

The central firing control circuit 32 monitors the input voltage to the bridges through monitoring circuits 44 and controls the inputs via contact actuators 46. The central firing control circuit 32 also communicates with the bridge firing control circuits 30 and 28 over a communication bus 48. It should be appreciated, that while only two parallel bridge circuits are shown, typically a larger number are used. The central firing control card controls and communicates with the additional bridges in a similar manner.

In a traditional analog control system, both SCRs AP1 and AP2 within corresponding segments are fired at very close to the same time. Ideally, line inductances and SCR cell characteristics for the parallel legs are identical and the resulting currents are balanced. In practice that does not always happen. Thus, the leg currents are not always balanced.

In a digital system where the currents are measured at specific times, it is possible to calculate any function of the current each cell or segment carries, e.g., the average current is one such function. By occasionally skipping (not firing) an SCR associated with a given cell, which carries more than its average share of current, the average current per leg can be balanced. It is also possible, in accordance with this invention, to advance or retard the firing commands to individual SCRs in order to cause the cells in parallel legs of the different bridges to carry balanced currents, or to unbalance the currents as desired.

One method of accomplishing advancing or retarding the firing control points of the SCRs is to use a digital counter at each bridge firing control circuit 28 and 30. The SCR firing pulse sent from the central firing control circuit 32 takes into account an additional delay at each bridge by the balance counter which will be started by the arrival of the firing signal. The counter is clocked at a known rate in all bridges. The local bridges vary the count at which each SCR fires plus/minus from the middle count to adjust the current to the appropriate percentage of the total. The adjustment range is from a count of zero to the maximum count of the counter.

The SCR control method of this invention is referred to as skip firing. It is a method used to control the current balance in parallel devices to obtain a desired affect. The basic principal is to control the average current of an element by "not firing" the element a controlled number of times or varying the point at which the element fires. Because of the large inductance of the load on the parallelled bridges, establishing or controlling appropriate duty cycles for the individual bridges by skipping cycles or adjusting the cycles does not introduce appreciable disturbance in the load current. To work effectively only a given number of parallel corresponding elements can skip at the same time. Certainly in the example shown in this embodiment not more than one such element can skip its firing cycle at the same time. Skip firing can be used to control the average current balance in parallel legs or can be used to unbalance a system to compensate for an element that is heating up.

The following description is one example of how skip firing can work to achieve the current balance between cells. Over a given time interval, bridge fire control 28 and bridge fire control 30 measure the current in each cell (element—in this case SCR) in the bridge. At the end of the time interval the average current for each cell is calculated and sent to the central firing control circuit (exciter firing control). Heat sink temperatures are also recorded from the sensors 34, which can be resistance temperature devices. The recorded information is sent to the central firing control 32. Algorithms in the central firing control 32 calculate when and how often each cell in each bridge should not be fired or have its firing period advanced or retarded. The central firing control 32 sends this information, the "skip firing code", over the communication bus 48 to the bridge firing control circuits 28 and 30. Each bridge firing control circuit then skip fires based on the "skip firing code". The process continues with the collection of more data and subsequent modification to the "skip firing code" by the central firing control circuit 32.

Figure 3:
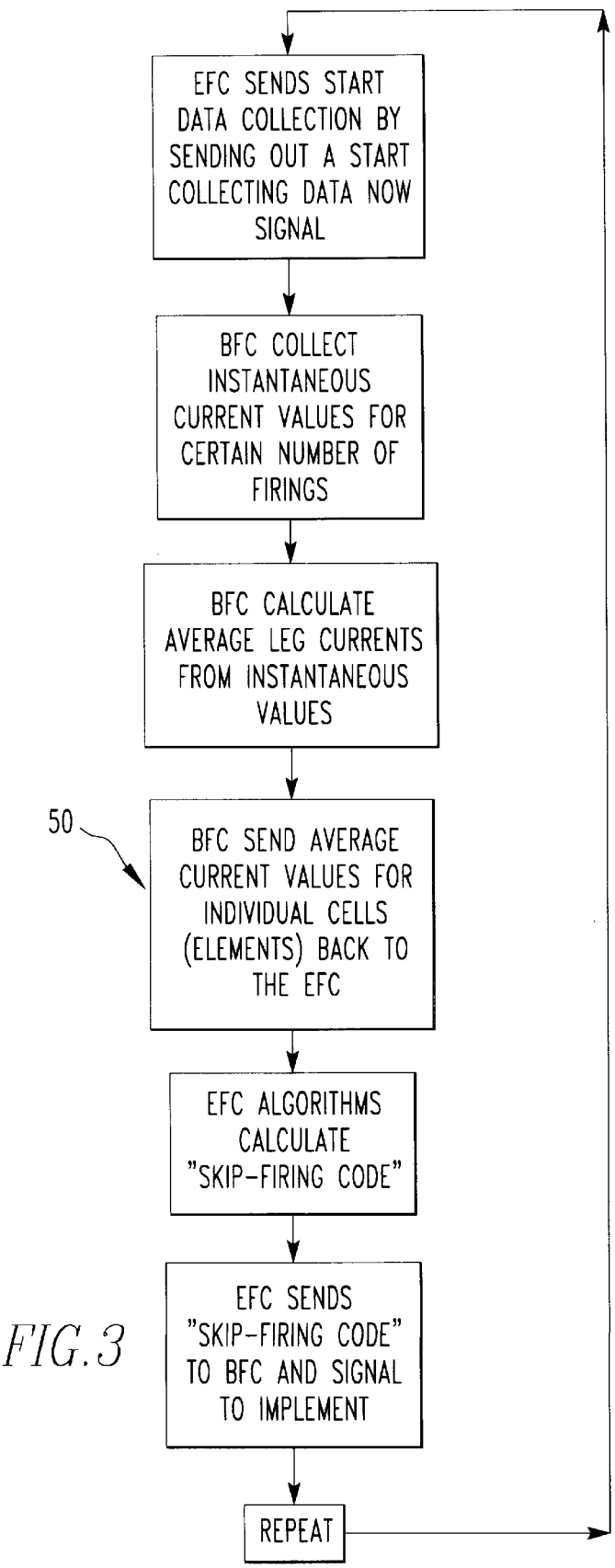
FIG. 3 is a logic flow diagram which shows the data communication scheme for the skip fire embodiment of this invention.

The "skip firing code" is a code designed to be sent to each bridge firing control circuit (BFC) 28 and 30 by the central control circuit (EFC) 32 over the communication bus 48. The code is designed to tell each bridge how many cycles to skip, how those cycles are to be distributed over a time interval, and how those skips are timed so as not to skip simultaneously the corresponding segment on any other bridge. A flow diagram showing the data interchange between the BFC 28 and 30 and the EFC 32 is illustrated in FIG. 3. The central firing control circuit, also known as the Exciter firing control, EFC 32, starts data collection from the bridge firing circuits 28 and 30 by sending out a start data collection signal. In response to the start data collection signal, the BFCs collect instantaneous current values for a predetermined number of firings. From the instantaneous current values, the BFCs calculate the average leg or cell currents. The average currents are then sent to the EFC 32 which uses the average current information to calculate the skip-firing code, which is described more fully with respect to FIG. 4. The EFC then sends the skip-firing code to each of the BFCs with an appropriate signal to implement the firing cycle. The process is continually repeated during operation of the parallel bridge assembly.

Figure 4:
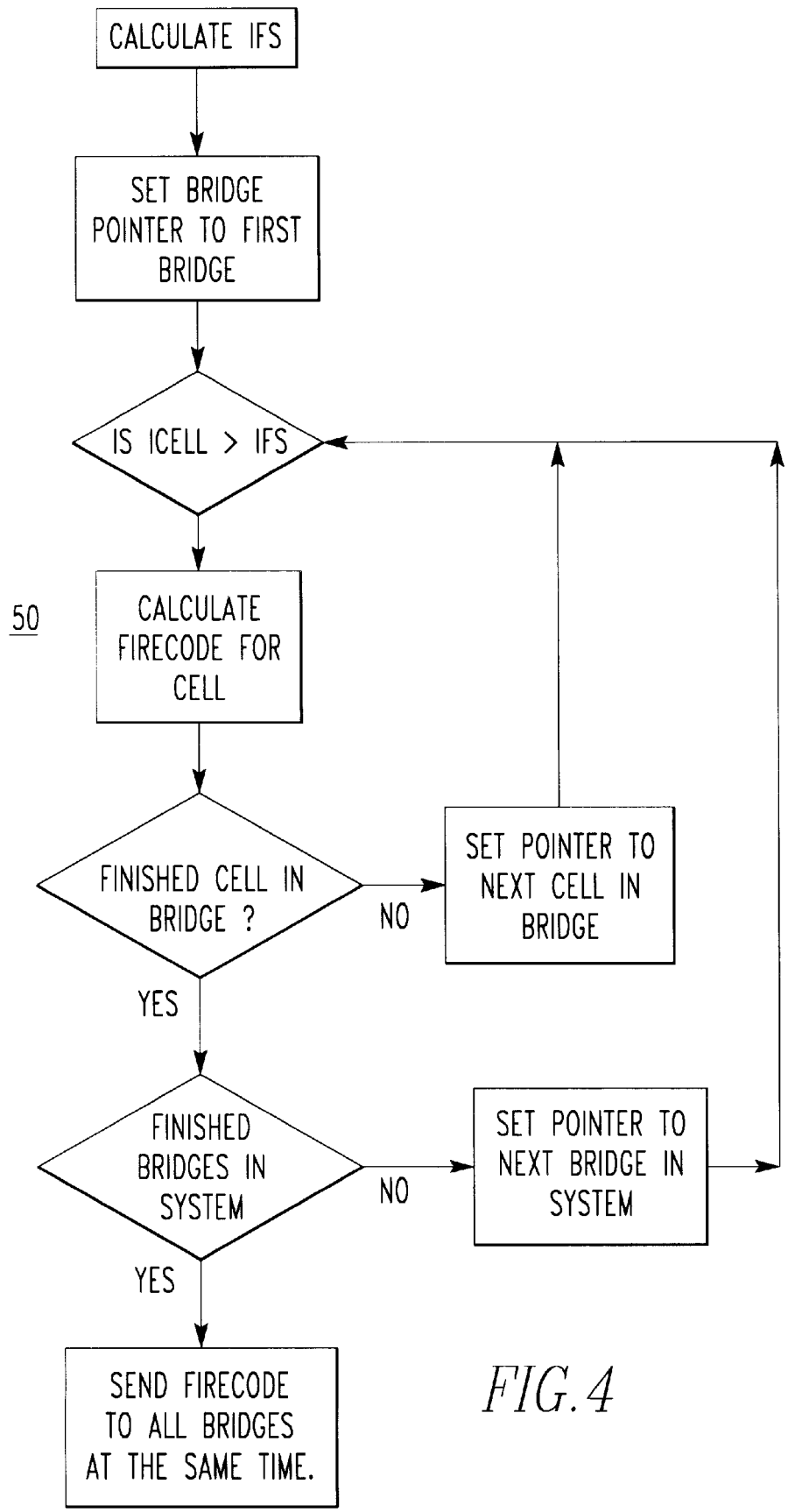
FIG. 4 is a logic flow diagram which shows the process employed for generating the skip fire code of this invention.

FIG. 4 illustrates a flow diagram representative of the process that the EFC employs to generate the skip-firing code. A fair share leg current is determined by dividing the total output current by the number of bridges. The EFC then sets a pointer to the first bridge and calculates whether the average cell or leg current is greater than the fair share current Ifs. From that information the EFC calculates the fire code for that cell. The fire code in this example is a 32–40 bit digital message that identifies the bridge and cell being addressed and provides a direction for either skipping or not skipping a cell-conducting cycle. The same process is repeated for each cell in a bridge and then the pointer is set to the next bridge to repeat the process until a skip-fire code is generated for all the cells in all the bridges.

The skip-firing codes are communicated to the bridge firing circuits 28 and 30 simultaneously over the communication bus 48. The skip-firing code also identifies the number of cycles to be skipped. The microprocessors in the bridge firing circuits 28 and 30 decipher the skip-firing code and identify the cell being directed to skip a cycle. The bridge firing circuit then sets a timer corresponding to the cell being addressed which times out at the appropriate cycle to be skipped. For example, if the skip-firing code directed the particular cell to skip every thirty second cycle, the timer would be set to 31 and would be incremented a step down each firing cycle until at zero count its corresponding SCR would skip the corresponding cycle. After each skip, the timer would be reset to skip the next thirty second cycle.

As previously mentioned, when a small number of bridges are connected in parallel, it is desirable not to have two bridges skip-firing at the same time. If there were a large number of bridges in the system, the current output could tolerate more than one bridge skipping, so long as it was a relatively small number. To assure more bridges don't simultaneously skip a given cycle than is permissible, the skip-firing code identifies the bridge, or bridges, if any, that are being directed to skip-firing. Even though a counter associated with a particular SCR may time out in a given cycle, the corresponding cell will not skip-firing unless directed by the skip-firing code corresponding to that cycle. Nevertheless, upon timing out the counter will be reset and repeat its counting cycle. In the event the timer times out without the corresponding SCR skip-firing, the bridge firing circuit sets a flag which directs the cell to skip a firing cycle the next time the skip-firing code identifies that cell is to skip a cycle, regardless of the count on the cells corresponding counter. In this way the proper number of cycles are skipped without more than the proper number of legs skipping a cycle at the same time.

In one embodiment, the EFC determines the number of cycles skipped for a cell by the amount the cell current, Icell, is greater than the fair share leg current, Ifs. In another embodiment the EFC directs the bridge circuit to skip a given number of cycles regardless of the difference between the cell current and the fair share leg current so long as the cell current exceeds the fair share leg current by a predetermined amount. If subsequent analysis identifies that the same cell current still exceeds the fair share leg current then the EFC directs the bridge circuit to increase the number of cycles in a given period skipped for that cell. In this way, the balance in the individual cells can be adjusted so that corresponding legs of the bridges pass substantially the desired amounts of current. As previously described, a similar procedure can be employed for delaying or advancing the firing of individual cells for the same purpose.

While this invention has particular benefit to achieve the desired affect of a preselected balance in bridges in a parallel array it can also be employed with benefit to balancing currents among the individual segments of a single bridge to provide a higher quality DC output or unbalancing the currents for other desired purposes. Thus, while specific embodiments of the invention have been described in detail, it will be appreciated by those skilled in the art that various modification and alternatives to those details could be developed in light of the overall teachings of the disclosure. Accordingly, the particular arrangements disclosed are meant to be illustrative only, and not limiting as to the scope of the invention which is to be given the full breath of the claims appended and any and all equivalents thereof.

What is claimed is:

1. A parallel array of a plurality of bridges for converting AC to DC, each bridge comprising a same plurality of segments including:
   an element in each segment responsive to a control signal to control current conduction within the segment;
   a current sensor for monitoring the current conducted by each segment;
   a first comparator, having input from the current sensor, for comparing the current conducted by corresponding segments on the plurality of bridges; and
   a bridge control circuit, having input from the first comparator, for adjusting the current conduction of one of the elements in the corresponding segments when said first comparator identifies a first predetermined relationship between the current in the corresponding segments, in a manner that will bring the segments into a second predetermined relationship.

2. The bridge array of claim 1 wherein the first predetermined relationship is an imbalance in current among the corresponding segments and the second predetermined relationship is to establish a balance of current among the corresponding segments.

3. The bridge array of claim 1 wherein the bridge control circuit causes the element conducting the larger current in the corresponding segment to skip a cycle of current conduction.

4. The bridge array of claim 1 wherein the bridge control circuit alters the timing of the period of current conduction of one of the elements in the corresponding segments exhibiting the imbalance in a manner that will bring the segments into balance.

5. The bridge array of claim 1 including:
   a temperature sensor for monitoring the temperature in each element;
   a second comparator, having input from the temperature sensor, for comparing the temperature in corresponding segments; and
   wherein the bridge control circuit, having input from the second comparator, adjusts the current conduction of one of the elements in the corresponding segments, when said second comparator identifies an imbalance in temperature in the corresponding segments, in a manner that will bring the segments into balance.

6. The bridge array of claim 1 wherein each bridge includes a bridge control circuit that monitors current conducted by each element in the corresponding bridge, averages the current information over a predetermined number of cycles and communicates the average current values to a central control circuit that compares the average current values from corresponding segments and issues a control message, upon the identification of an imbalance, to one of the bridge control circuits to adjust the current conduction to one of the elements in the corresponding segments exhibiting the imbalance, in a manner that will bring the segments into balance.

7. The bridge array of claim 6 wherein the central control circuit sends a code to the bridge circuit instructed to alter the current conduction of one of its elements that informs the bridge control circuit how many current conduction cycles to skip.

8. The bridge array of claim 7 wherein the code from the central control circuit informs the bridge control circuit how the skipped cycles are to be distributed over a time interval.

9. The bridge array of claim 7 wherein the code from the central control circuit informs the bridge control circuit how the skipped cycles are to be timed so as not to skip simultaneously another corresponding element on another bridge.

10. The bridge array of claim 1 wherein each bridge is a three-phase AC rectifier and the first comparator compares currents in the same phase in the corresponding segments.

11. The bridge array of claim 1 wherein the elements are Semiconductor Controlled Rectifier.

12. A method of controlling the balance of parallel array of a plurality of controlled rectifier (CR) bridges used for converting AC to DC, wherein each bridge comprises a same plurality of CR segments including the steps of:
   monitoring the current in each CR segment;
   comparing the currents conducted by corresponding segments on the plurality of bridges; and
   altering the conduction of at least one CR in a corresponding segment that the comparison shows a first predetermined balance of current relationship to the current in the other corresponding segments in a manner that will bring the corresponding segments into a second predetermined balance of current relationship.

13. The bridge array of claim 12 wherein the first predetermined relationship is an imbalance in current among the corresponding segments and the second predetermined relationship is to establish a balance of current among the corresponding segments.

14. The method of claim 12 wherein the altering step adjusts the timing of current conduction of the corresponding CR.

15. The method of claim 12 wherein the altering step skips a cycle of current conduction of the corresponding CR.

16. The method of claim 12 where not all of the corresponding CRs have their current conduction cycle altered at the same time.

17. The rectifier bridge of claim 16 wherein the segments compared carry current in the same phase.

18. The method of claim 12 where not more than one of the corresponding CRs has its current conduction cycle altered at any given instant in time.

19. A controlled rectifier bridge for converting AC to DC having a plurality of rectifier segments comprising:

at least one segment for each polarity for each phase of current rectified by the bridge;

a current sensor for monitoring the current in each phase;

a first comparator for comparing the current conducted in at least two segments; and a bridge control circuit, having input from the first comparator for adjusting the current conduction in the segments compared to maintain the current in each of the compared segments in a predetermined balance of current relationship.

* * * * *